(12) United States Patent
Policandriotes et al.

(10) Patent No.: US 11,817,752 B2
(45) Date of Patent: Nov. 14, 2023

(54) HYBRID AXIAL/RADIAL ELECTRIC MOTOR

(71) Applicant: Hamilton Sundstrand Corporation, Charlotte, NC (US)

(72) Inventors: Tod Policandriotes, Suffield, CT (US); Parag M. Kshirsagar, South Windsor, CT (US); Suman Dwari, Vernon, CT (US); Beata I. Wawrzyniak, South Windsor, CT (US); Jagadeesh Kumar Tangudu, South Windsor, CT (US); Sreenivasa R. Voleti, Farmington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 165 days.

(21) Appl. No.: 17/366,275

(22) Filed: Jul. 2, 2021

(65) Prior Publication Data

US 2022/0320981 A1    Oct. 6, 2022

Related U.S. Application Data

(60) Provisional application No. 63/169,403, filed on Apr. 1, 2021.

(51) Int. Cl.
*H02K 16/04* (2006.01)
*H02K 1/32* (2006.01)

(52) U.S. Cl.
CPC .............. *H02K 16/04* (2013.01); *H02K 1/32* (2013.01)

(58) Field of Classification Search
CPC ............. H02K 16/04; H02K 1/32; H02K 9/12

USPC ..................... 310/58–59, 112, 114, 266–268
See application file for complete search history.

(56) References Cited

U.S. PATENT DOCUMENTS

| | | | |
|---|---|---|---|
| 6,137,203 A | * | 10/2000 | Jermakian ................. B60L 7/14 310/191 |
| 6,348,751 B1 | | 2/2002 | Jermakian et al. |
| 6,891,306 B1 | | 5/2005 | Soghomonian et al. |
| 7,034,422 B2 | | 4/2006 | Ramu |
| 7,755,244 B2 | | 7/2010 | Ley et al. |

(Continued)

FOREIGN PATENT DOCUMENTS

| CN | 211830523 U | * | 10/2020 |
|---|---|---|---|
| EP | 3312978 A1 | | 4/2018 |

OTHER PUBLICATIONS

Wei, X. et al., "Design of a Novel Axial-Radial Flux Permanent Magnet Motor," Oct. 22-25, 2014, 17th International Conference on Electrical Machines and Systems (ICEMS), pp. 80-84, Hangzhou, China.

(Continued)

*Primary Examiner* — Jose A Gonzalez Quinones
(74) *Attorney, Agent, or Firm* — CANTOR COLBURN LLP

(57) ABSTRACT

Provided are embodiments for a method and a hybrid axial/radial motor. Embodiments can include a central rotor that includes an axial segment, a first radial segment, and a second radial segment, wherein the first radial segment extends axially from a first side of the axial segment and the second radial segment extends axially from a second side of the axial segment, wherein the first side is opposite the second side. Embodiments can also include a stator adapted to receive the first radial segment or the second radial segment of the central rotor.

18 Claims, 6 Drawing Sheets

(56) References Cited

U.S. PATENT DOCUMENTS

| | | |
|---|---|---|
| 10,476,324 B2 | 11/2019 | Hosek et al. |
| 10,700,562 B2 | 6/2020 | Chen et al. |
| 2011/0156519 A1 | 6/2011 | Wang et al. |

OTHER PUBLICATIONS

European Search Report for Application No. 22166163.0, dated Sep. 1, 2022, 76 pages.

* cited by examiner

HYBRID AXIAL/RADIAL ELECTRIC MOTOR

CROSS-REFERENCE TO RELATED APPLICATIONS

This application claims the benefit of U.S. Provisional Application No. 63/169,403, filed Apr. 1, 2021, the disclosure of which is incorporated herein by reference in its entirety.

BACKGROUND

The present invention relates to electric machines, and more specifically, to a hybrid axial/radial elector motor.

Electric motors can be used for a wide variety of applications. Electric motors are operated by controlling an electromagnetic field to generate a force to move a rotor which can be attached to a shaft to do work. Different types of applications can require different output characteristics such as high speed, high torque, etc. These output characteristics are generally trade-offs from each other due to the physical arrangements of the different types of motors such as axial motors and radial motors. Challenges may exist for applications that require both high torque and high-speed capabilities. There may be a need to improve the electric motor characteristics to include high speed and high torque characteristics into a single motor.

BRIEF DESCRIPTION

According to an embodiment, a hybrid electric motor is provided. The motor can include a central rotor, wherein the central rotor includes an axial segment, a first radial segment, and a second radial segment, wherein the first radial segment extends axially from a first side of the axial segment and the second radial segment extends axially from a second side of the axial segment, wherein the first side is opposite the second side; and a stator adapted to receive the first radial segment or the second radial segment of the central rotor.

In addition to one or more of the features described herein, or as an alternative, further embodiments include a stator that includes a first stator and a second stator, wherein the first stator further includes a first stator radial core and a first stator axial core and is adapted to receive the first radial segment, and the second stator further includes a second stator radial core and a second stator axial core and is adapted to receive the second radial rotor segment.

In addition to one or more of the features described herein, or as an alternative, further embodiments include an axial segment, a first radial segment, and a second radial segment that are a single integrated part.

In addition to one or more of the features described herein, or as an alternative, further embodiments include a diameter of the axial segment of the central rotor that is larger than a diameter of the first radial segment and the second radial segment of the central rotor.

In addition to one or more of the features described herein, or as an alternative, further embodiments include an axial segment that includes a plurality of magnets that are arranged to convey an electromagnetic field in an axial direction during operation.

In addition to one or more of the features described herein, or as an alternative, further embodiments include a first radial segment and the second radial segment that further include a plurality of magnets that are arranged to convey an electromagnetic field in a radial direction during operation.

In addition to one or more of the features described herein, or as an alternative, further embodiments include an outer diameter of the axial segment that is adapted to drive a load.

In addition to one or more of the features described herein, or as an alternative, further embodiments include a shaft coupled to the central rotor that is adapted to drive a load.

In addition to one or more of the features described herein, or as an alternative, further embodiments include a plurality of cooling vents arranged on the central rotor to cool the central rotor during operation.

In addition to one or more of the features described herein, or as an alternative, further embodiments include a plurality of cooling vents arranged the first stator or the second stator to cool the stator during operation.

According to an embodiment, a method for operating a hybrid electric motor is provided. The method can include arranging a central rotor and a stator, wherein the central rotor comprises an axial segment and a radial segment, wherein the stator comprises a stator axial core and a stator radial core; coupling the axial segment of the central rotor to the stator axial core of the stator; and coupling the radial segment of the central rotor to the stator radial core of the stator.

In addition to one or more of the features described herein, or as an alternative, further embodiments include a radial segment that includes an arrangement having a first radial segment that extends from a first side of the axial segment and a second radial segment that extends from a second side of the axial segment, wherein the first side is opposite the second side.

In addition to one or more of the features described herein, or as an alternative, further embodiments include a stator having an arrangement including a first stator and a second stator, wherein the first stator further includes a first stator radial core and a stator axial core and is adapted to receive the first radial segment, and the second stator further includes a second stator radial core and a stator axial core and is adapted to receive the second radial segment.

In addition to one or more of the features described herein, or as an alternative, further embodiments include arranging a plurality of axial rotor magnets on the axial segment of the central rotor, and arranging a plurality of radial rotor magnets of the radial segment of the central rotor.

In addition to one or more of the features described herein, or as an alternative, further embodiments include coupling the plurality of axial rotor magnets to the stator axial core that conveys a magnetic flux in an axial direction.

In addition to one or more of the features described herein, or as an alternative, further embodiments include coupling the plurality of radial rotor magnets to the stator radial core that conveys a magnetic flux in a radial direction.

In addition to one or more of the features described herein, or as an alternative, further embodiments include cooling the central rotor using a plurality of cooling vents arranged on the central rotor, and cooling the stator using a plurality of cooling vents arranged on the stator.

In addition to one or more of the features described herein, or as an alternative, further embodiments include selecting a diameter of the axial segment of the central rotor to be larger than a diameter of the radial segment of the central rotor.

In addition to one or more of the features described herein, or as an alternative, further embodiments include driving a load using an outer diameter of the axial segment.

In addition to one or more of the features described herein, or as an alternative, further embodiments include driving a load using a shaft coupled to the central rotor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

In today's environment motors can be used in high-performance applications such as electric actuators, variable-speed motor drives, etc. Motors can be designed for high-torque applications or high-speed applications. High-torque motor designs have large diameter rotors which effectively provide a long lever arm that produces a high torque. Therefore, the large diameter rotors are not typically operated at high speed given its dimensions. On the other hand, high-speed motors do not traditionally provide high torque. Conventional high-speed motors use radial magnetic flux fields to increase the ability of the motor to operate at a high speed The techniques of one or more embodiments of the disclosure described herein include integrating an axial flux motor with a radial flux motor into a single hybrid electric motor architecture.

Figure 1:
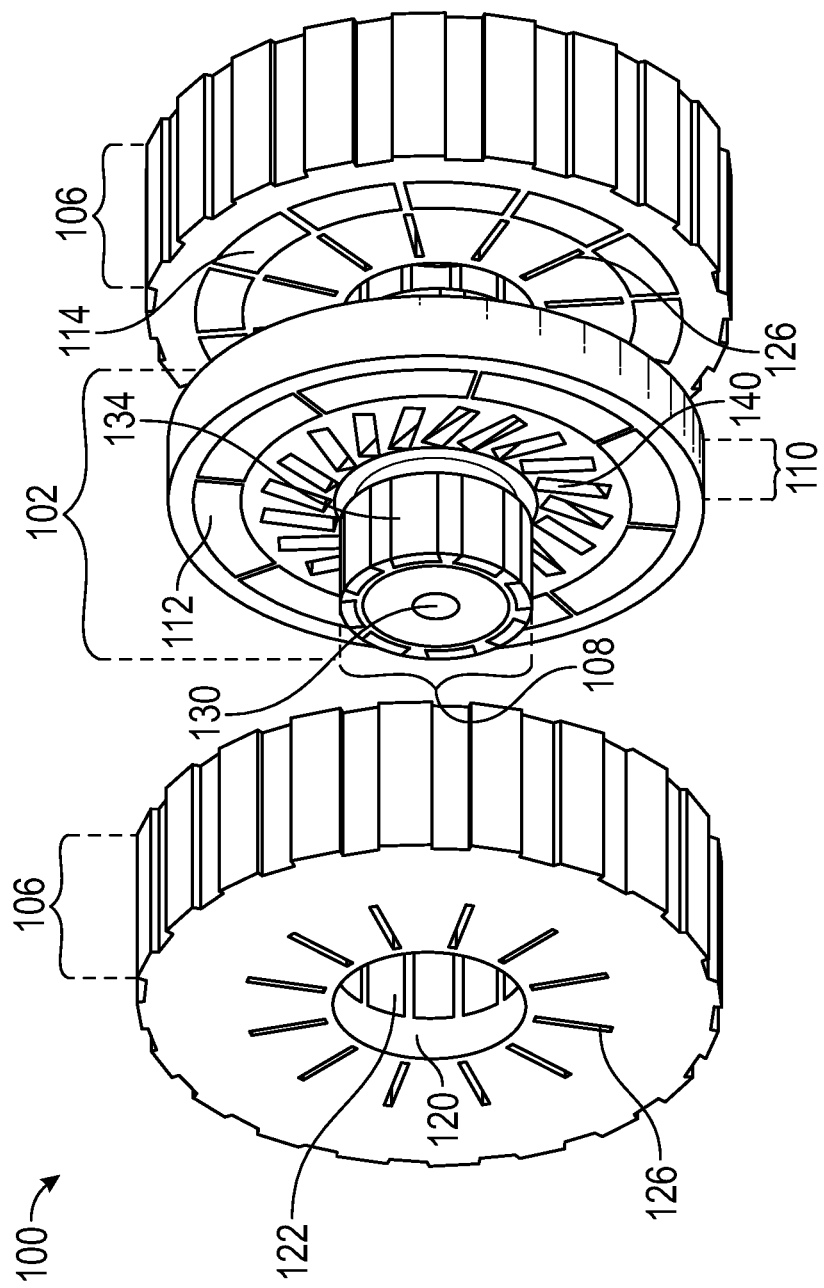
FIG. 1 is a schematic diagram illustrating components of a hybrid axial/radial electric motor in accordance with one or more embodiments of the disclosure.
Figure 2:
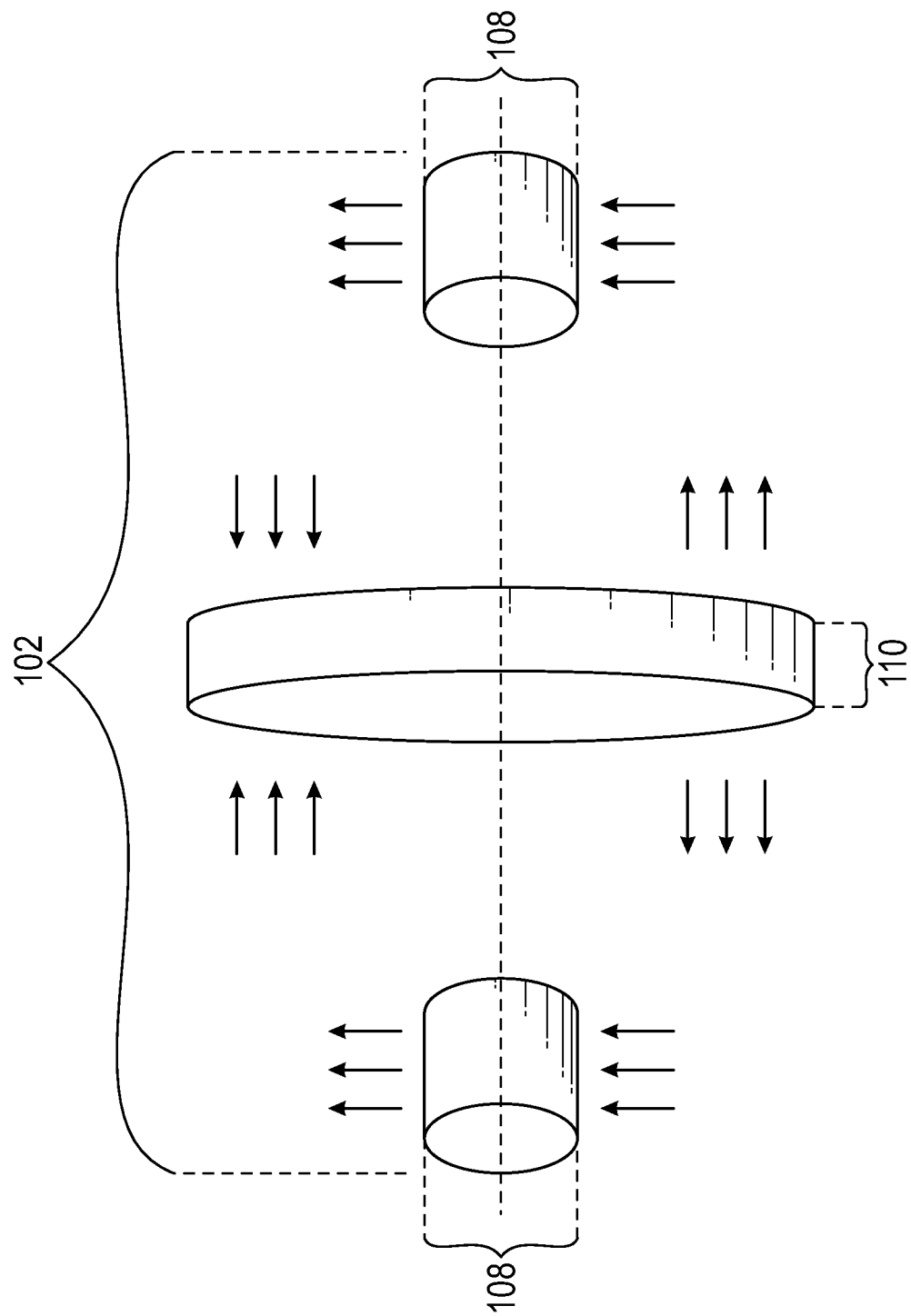
FIG. 2 depicts an illustration of the expanded view of the central rotor in accordance with one or more embodiments of the disclosure.

FIG. 1 depicts a schematic diagram illustrating components of a hybrid axial/radial electric motor 100 (hereinafter referred to as "motor 100") in accordance with one or more embodiments of the disclosure. The motor 100 can include a central rotor 102 and the stator 106. In one or more embodiments, the rotor 102 and the stator 106 can be made of composites or non-magnetic alloys of any type capable of withstanding temperature requirements of the motor 100. In a non-limiting example, the central rotor 102 and the stator 106 can be composed of structure composites such as but not limited to carbon fiber or a carbon matrix, carbon/glass/ polybenzo-bisoxazole (PBO) fibers with a polymer matrix, etc. In a different non-limiting example, the central rotor 102 and the stator 106 can be composed of functional composites such as but not limited to soft magnetic core composites (polymer matrix with metal particles). In other embodiments, the material for the stator can also be an injection molded component that surrounds the individual stator cores that is capable of holding them in place. In some embodiments, the motor 100 operates when an electric current or power source is fed to the windings of coils in the stator 106 which then creates a force that interacts with the magnetic components (e.g., permanent magnets) embedded in the central rotor 102 causing it to rotate (further discussed below). The central rotor 102 may include one or more radial segments 108 and axial segment 110. The radial segment 108 extends outwardly from the axial segment 110 of the central rotor 102. As shown in FIG. 1, the axial segment 110 can include a plate-like or disc-like structure where a plurality of axial rotor magnets 112 can be arranged thereto. The poles of the axial rotor magnets 112 can be arranged to convey an electromagnetic field in an axial direction. The axial rotor magnets 112 can be magnetically coupled to the stator axial core 114 of the stator 106 during the operation of the motor 100. In some embodiments, the magnetic elements can be arranged as a Halbach array or in the case that radial magnets are used, the radial magnets can be supported underneath by a steel sleeve. It should be understood that other magnetic arrangements can be used and is not limited by the disclosure provided herein. An outer layer of the magnetic elements can be covered by a sleeve in the radial direction and a cover in the axial direction where the sleeve and cover function to keep the magnets in place under the stresses and slippages caused by operation of the motor 100. In one or more embodiments, the sleeve can include a fiber-reinforced radial sleeve where the fiber can include carbon, aramid, glass and PBO fibers to name a few. In addition, a matrix can include materials such as but not limited to thermoplastic and thermoset polymers such as epoxy, aramid, and phenolic resins. With reference to FIG. 2, an expanded view of the central rotor 102 of FIG. 1 is provided. A simplified illustration of the radial segment 108 (permanent magnets are not shown) depicts a non-limiting representation of the field that can be conveyed in the radial direction represented by the arrows. Similarly, the arrows for the axial segment 110 (permanent magnets are not shown) provide a non-limiting representation of the field that can be conveyed in the axial direction. In one or more embodiments, the axial direction is perpendicular to the radial direction as shown in FIG. 2. The dashed lines represent the location on the axial segment 110 where the radial segment(s) 108 are attached. In one or more embodiments of the disclosure, a heteropolar flux path and/or a homopolar flux path can be implemented for torque generation of the motor 100.

Referring to FIG. 1, in one or more embodiments of the disclosure, the central rotor 102 is a single integrated part or component that includes the axial segment 110 and the radial segment(s) 108. In FIG. 1, the radial segment(s) 108 (a first radial segment and a second radial segment) and axial segment 110 are physically fixed together and rotate together during the operation of the motor 100. In FIG. 1, it can be appreciated the second radial segment 108 is not visible in the perspective view but includes corresponding components as the first radial segment 108 that is visible.

In one or more embodiments of the disclosure, the axial segment 110 of the central rotor 102 can include a plurality of vents 140 in the plate-like structure of the central rotor 102 to form an air gap for cooling. The center of the central rotor 102 can include an opening 130 for a shaft (not shown) or conduit for cables (not shown).

Figure 5A:
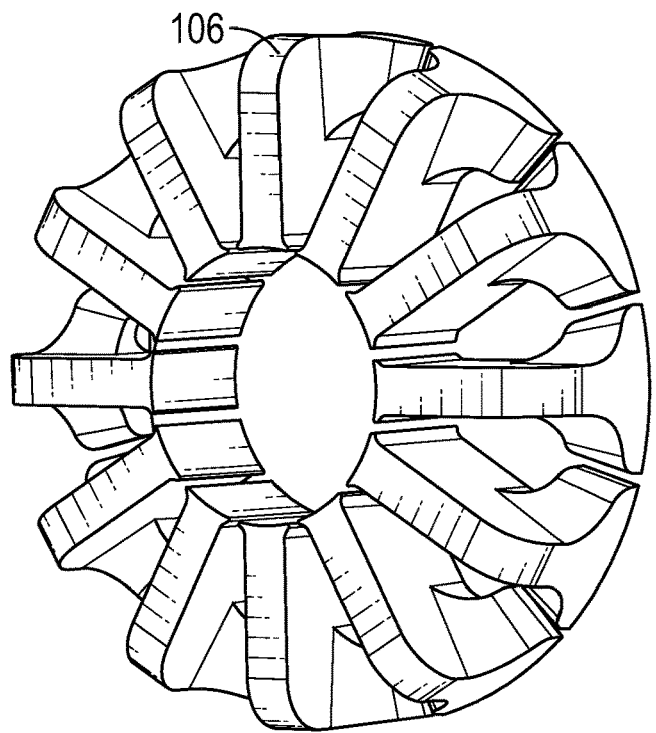
FIGS. 5A and 5B provide different perspective views of an example stator cores in accordance with one or more embodiments of the disclosure.
Figure 5B:
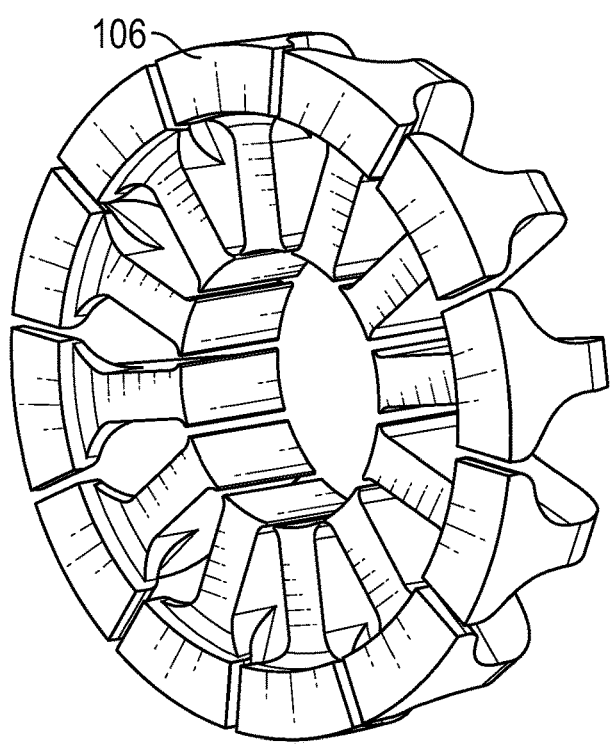
Figure 6A:
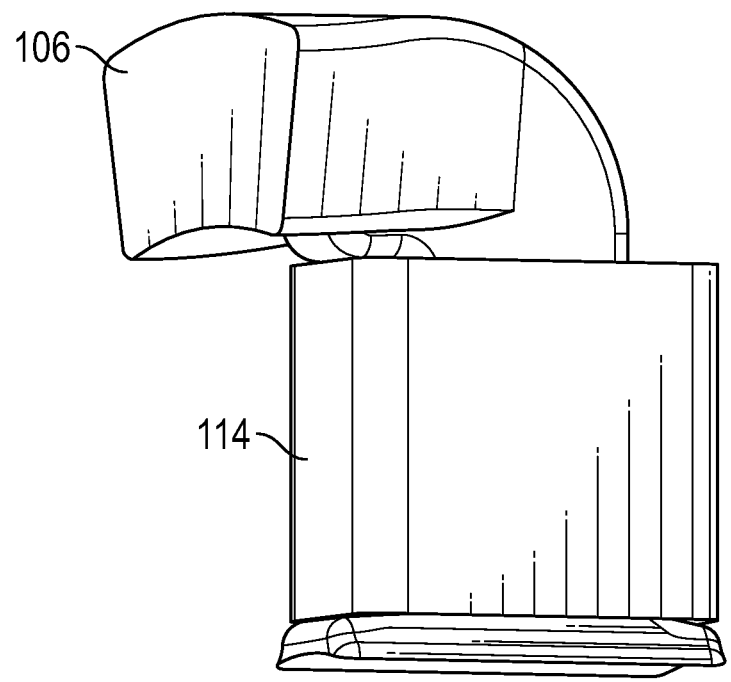
FIGS. 6A and 6B provide examples of a coil of the stator core in accordance with one or more embodiments of the disclosure.
Figure 6B:
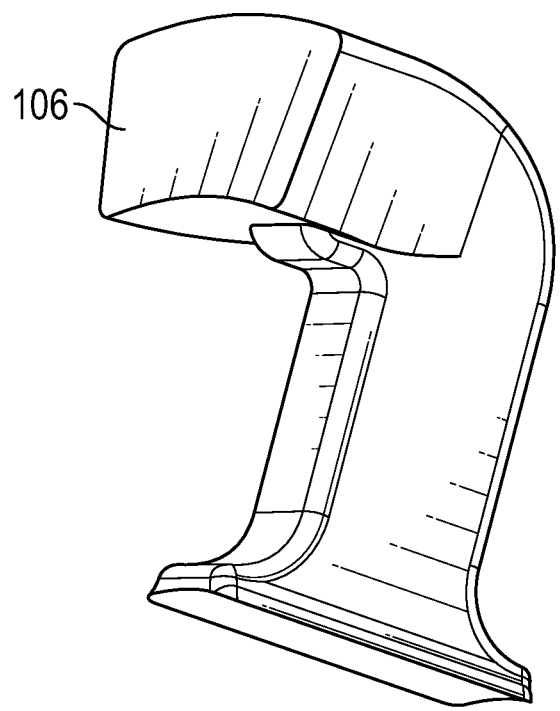

In one or more embodiments of the disclosure, the stator 106 can include a stator radial core 122 and the stator axial core 114. FIGS. 5A and 5B illustrate an example of different perspective views of the stator. Although FIG. 1 illustrates a perspective view where some components are may not be visible, it should be understood the stator 106 on the right of the central rotor 102 and the stator 106 on the left of the central rotor 102 both include corresponding components that are described herein. The stator 106 includes an opening 120 located that is adapted to receive the radial segment 108 of the central rotor 102. An inner surface of the opening in the stator 106 can include a stator radial core 122 which includes a plurality of magnetic components such as coils, windings, magnets, etc. FIG. 6A depicts an example magnetic component 114 such as the coil that can be used in the stator 106. FIG. 6B depicts a example of the stator core that does not include the coil. The stator radial core 122 is magnetically coupled to the radial rotor magnets 134 during operation and causes the rotation of the central rotor 102. The poles of the radial rotor magnets 134 can be arranged to convey an electromagnetic field in the radial direction.

The stator axial core 114 of the stator 106 can be arranged on the surface of the sidewall of the stator 106 or integrated into the stator 106. The stator axial core 114 can be magnetically coupled to the axial rotor magnets 112 during the operation of the motor 100. The poles of the axial rotor magnets 112 can be arranged to convey an electromagnetic field in an axial direction. The axial rotor magnets 112 can be magnetically coupled to the stator axial core 112 of the stator 106 during the operation of the motor 100.

In one or more embodiments of the disclosure, the diameter of the axial segment 110 of the central rotor 102, wherein the larger diameter provides an effective longer lever arm and the ability to increase the number of magnetic poles to achieve high torque characteristics. The diameter of the radial segment 108 can have a smaller diameter than the axial segment 110 which enables the ability for high-speed applications. By combining the features, the motor 100 can achieve both high torque and high-speed characteristics.

Although FIG. 1 depicts a number of magnetic elements for the radial rotor magnets 134, the axial rotor magnets 112, the stator radial core 122, and the stator axial core 114, it should be understood that any number of magnetic elements can be envisioned to be within the scope of the disclosure and is not intended to be limited by the illustration of the figures.

In one or more embodiments of the disclosure, the stator 106 can include a plurality of vents 126 to cool the stator 106 during operation. In addition, the central rotor 102 can include a plurality of vents 140. In different embodiments, the vents can be omitted and other cooling mechanisms or cooling circuits can be used. For example, a liquid cooling circuit can be used to directly cool the stator core, where the liquid cooling circuit can include tubes entering and existing the stator core (not shown). The illustrations of vents 126, 140 are not intended to limit the scope of the disclosure but are merely representative of the vents that are envisioned to be within the scope of the embodiments of the disclosure. One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 3:
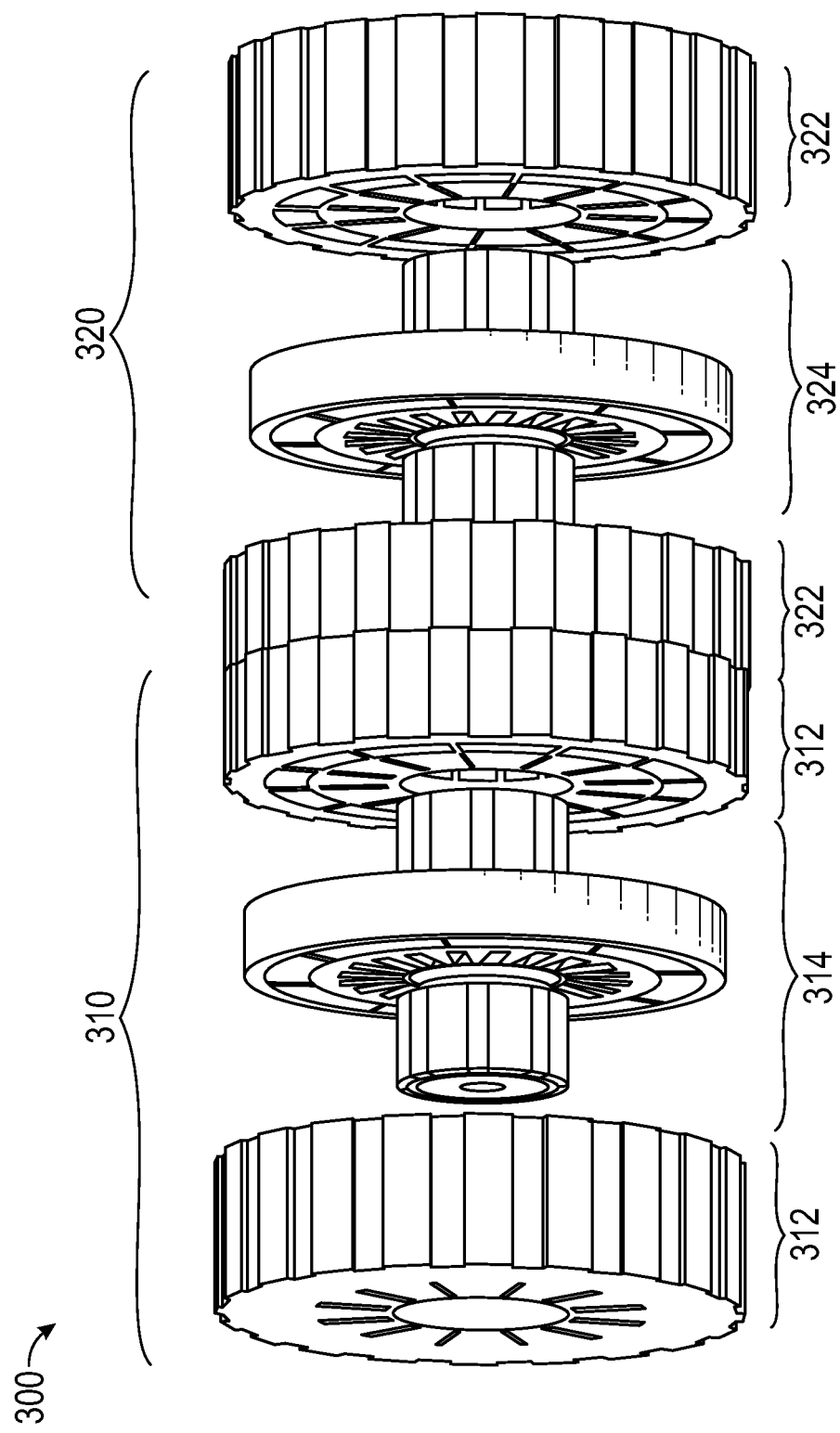
FIG. 3 is a schematic diagram of a multiple hybrid axial/radial electric motor in accordance with one or more embodiments of the disclosure.

FIG. 3 depicts a schematic diagram of a multi-hybrid axial/radial electric motor 300 (hereinafter referred to as "motor 300" in accordance with one or more embodiments of the disclosure. FIG. 3 depicts the combined motor such as that shown in FIG. 1. Each of the portion 310, 320 of the motor 300 includes its respective the central rotor 314, 324, the respective stators 312, 322, and other corresponding components discussed with reference to FIG. 1. In one or more embodiments of the disclosure, the stator 312 of the first portion 310 is coupled to a neighboring stator 322 of the second portion 320 to form the motor 300. Although FIG. 3 depicts a combination of two portions 310, 320, it should be understood that any number of components can be combined to meet the requirements of the desired application. For example, 3, 5, 10, etc. components can be combined to increase the versatility of the motor 300. One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
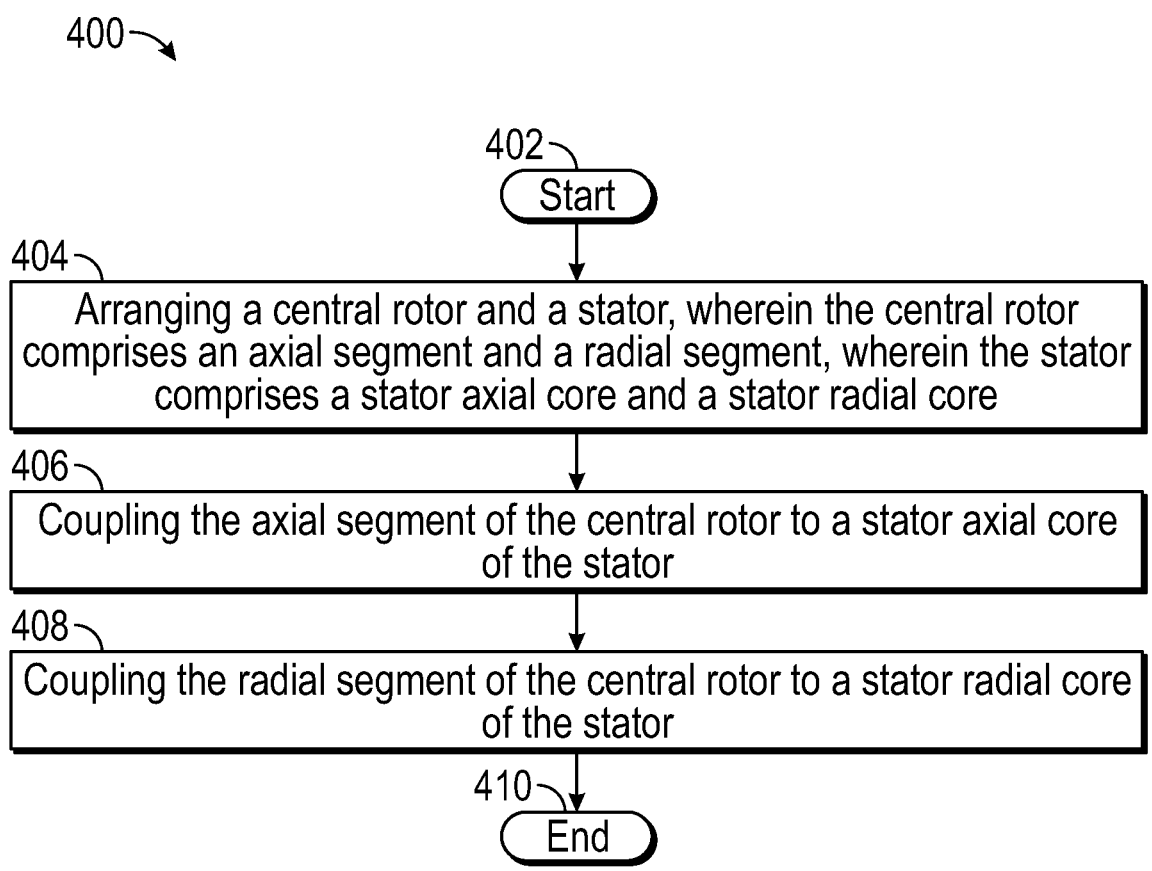
FIG. 4 is a flowchart of a method for operating the hybrid axial/radial electric motor in accordance with one or more embodiments of the disclosure.

FIG. 4 depicts a flowchart of a method 400 for operating a hybrid axial/radial electric motor in accordance with one or more embodiments of the disclosure. The method 400 can be implemented in the system 100 or 300 or any other similar type of system. The method 400 begins at block 402 and proceeds to block 404 which provides for arranging a central rotor and a stator, wherein the central rotor comprises an axial segment and a radial segment, wherein the stator comprises a stator axial core and a stator radial core. In one or more embodiments, the stator includes a first stator and a second stator, wherein the first stator includes a stator radial core and a stator axial core and is adapted to receive the first radial segment, and the second stator includes a stator radial core and a stator axial core and is adapted to receive the second radial segment. Block 406 couples the axial segment of the central rotor to a stator axial core of the stator. Block 408 coupling the radial segment of the central rotor to a stator radial core in the stator. The method 400 ends at block 410. It should be understood the steps provided in FIG. 4 are not intended to be limiting but represent a non-limiting example of steps that are considered to be within the scope of the disclosure.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

The technical effects and benefits include combining both the radial and axial components of different motors into a single hybrid electric motor architecture to achieve both high-torque and high-speed characteristics. The high torque features from the larger diameter rotor of an axial motor and the high-speed features from a smaller diameter of the radial motor are realized in the combined architecture. In addition, the motor can be scaled as needed for the selected application which increases the versatility of the hybrid motor.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric motor comprising:
   a central rotor, wherein the central rotor comprises an axial segment, a first radial segment, and a second radial segment, wherein the first radial segment extends axially from a first side of the axial segment and the second radial segment extends axially from a second side of the axial segment, wherein the first side is opposite the second side;
   wherein the axial segment comprises a plurality of magnets that are arranged to convey an electromagnetic field in an axial direction during operation and wherein the first radial segment and the second radial segment comprise a plurality of magnets that are arranged to convey an electromagnetic field in a radial direction perpendicular to the axial direction during operation; and
   a stator adapted to receive the first radial segment or the second radial segment of the central rotor.

2. The motor of claim 1, wherein the stator comprises a first stator and a second stator, wherein the first stator comprises a first stator radial core and a first stator axial core and is adapted to receive the first radial segment, and the second stator comprises a second stator radial core and a second stator axial core and is adapted to receive the second radial rotor segment.

3. The motor of claim 1, wherein the axial segment, the first radial segment, and the second radial segment are a single integrated part.

4. The motor of claim 1, wherein a diameter of the axial segment of the central rotor is larger than a diameter of the first radial segment and the second radial segment of the central rotor.

5. The motor of claim 1, further comprising a shaft coupled to the central rotor that is adapted to drive a load.

6. The motor of claim 1, further comprising a plurality of cooling vents arranged the first stator or the second stator to cool the stator during operation.

7. A method of operating a hybrid axial/radial motor, the method comprising:
   arranging a central rotor and a stator, wherein the central rotor comprises an axial segment and a radial segment, wherein the stator comprises a stator axial core and a stator radial core;
   wherein the axial segment comprises a plurality of magnets that are arranged to convey an electromagnetic field in an axial direction during operation and wherein the radial segment comprises a plurality of magnets that are arranged to convey an electromagnetic field in a radial direction perpendicular to the axial direction during operation;
   coupling the axial segment of the central rotor to the stator axial core of the stator; and
   coupling the radial segment of the central rotor to the stator radial core of the stator.

8. The method of claim 7, wherein the radial segment further comprises an arrangement including a first radial segment that extends from a first side of the axial segment and a second radial segment that extends from a second side of the axial segment, wherein the first side is opposite the second side.

9. The method of claim 7, wherein the stator comprises an arrangement including a first stator and a second stator, wherein the first stator comprises a first stator radial core and a first stator axial core and is adapted to receive the first radial segment, and the second stator comprises a second stator radial core and a second stator axial core and is adapted to receive the second radial segment.

10. The method of claim 7, further comprising arranging a plurality of axial rotor magnets on the axial segment of the central rotor, and arranging a plurality of radial rotor magnets of the radial segment of the central rotor.

11. The method of claim 10, wherein coupling the plurality of axial rotor magnets to the stator axial core conveys a magnetic flux in an axial direction.

12. The method of claim 10, wherein coupling the plurality of radial rotor magnets to the stator radial core conveys a magnetic flux in a radial direction.

13. The method of claim 7 further comprising cooling the central rotor using a plurality of cooling vents arranged on the central rotor, and cooling the stator using a plurality of cooling vents arranged on the stator.

14. The method of claim 7, wherein a diameter of the axial segment of the central rotor is larger than a diameter of the radial segment of the central rotor.

15. The method of claim 7, further comprising driving a load using an outer diameter of the axial segment.

16. The method of claim 7, further comprising driving a load using a shaft coupled to the central rotor.

17. A method of operating a hybrid axial/radial motor that includes a central rotor and a stator, wherein the central rotor comprises an axial segment and a radial segment extending from a side of the central rotor, wherein the stator comprises a stator axial core and a stator radial core, with the axial segment of the central rotor being coupled to the stator axial core of the stator and with the radial segment of the central rotor being coupled to the stator radial core of the stator, the method comprising:
   conveying via a plurality of magnets arranged on the axial segment an electromagnetic field in an axial direction during rotation of the rotor; and
   conveying via a plurality of magnets on the radial segment an electromagnetic field in a radial direction perpendicular to the axial direction during rotation of the rotor.

18. The method of claim 17 wherein the radial segment further comprises an arrangement including a first radial segment that extends from a first side of the axial segment and a second radial segment that extends from a second side of the axial segment, wherein the first side is opposite the second side; and wherein the stator comprises an arrangement including a first stator and a second stator, wherein the first stator comprises a first stator radial core and a first stator axial core and is adapted to receive the first radial segment, and the second stator comprises a second stator radial core and a second stator axial core and is adapted to receive the second radial segment.

\* \* \* \* \*